United States Patent [19]
Takeda et al.

[11] 4,140,334
[45] Feb. 20, 1979

[54] SUSPENSION APPARATUS FOR A VEHICLE

[75] Inventors: Hideo Takeda, Tokyo; Kiyoshi Fukuchi, Tokorosawa, both of Japan

[73] Assignee: Honda Giken Kogyo Kabushiki Kaisha, Tokyo, Japan

[21] Appl. No.: 839,739

[22] Filed: Oct. 5, 1977

Related U.S. Application Data

[62] Division of Ser. No. 692,575, Jun. 3, 1976.

[30] Foreign Application Priority Data

Jun. 6, 1975 [JP] Japan ............................. 50-7577350
Jun. 6, 1975 [JP] Japan ............................. 50-7577450

[51] Int. Cl.² ............................................. B60G 11/36
[52] U.S. Cl. ................................. 280/701; 267/20 A
[58] Field of Search ................ 267/20 A, 15 R, 15 A, 267/11; 280/701, 721, 725

[56] References Cited
U.S. PATENT DOCUMENTS 2,631,892  3/1953  Oppenlander ..................... 280/725

Primary Examiner—Philip Goodman
Attorney, Agent, or Firm—Haseltine, Lake & Waters

[57] ABSTRACT

A suspension apparatus for a vehicle having left and right wheels and comprising a pair of left and right trailing arms connected to a respective wheel, and a pair of laterally extending left and right rotary shafts connected to respective arms. The outer ends of the shafts are supported in bearings on the vehicle to permit individual rotation of the shafts and corresponding rocking of the arms and a tubular coupling interconnects the rotary shafts at the inner ends thereof also to permit individual rotation of the shafts. The suspension apparatus can be of semi-trailing type in which case the rotary shafts have bends therein and their inner ends rotate in the coupling about axes which are inclined with respect to the axes of rotation of the shafts in the bearings.

6 Claims, 5 Drawing Figures

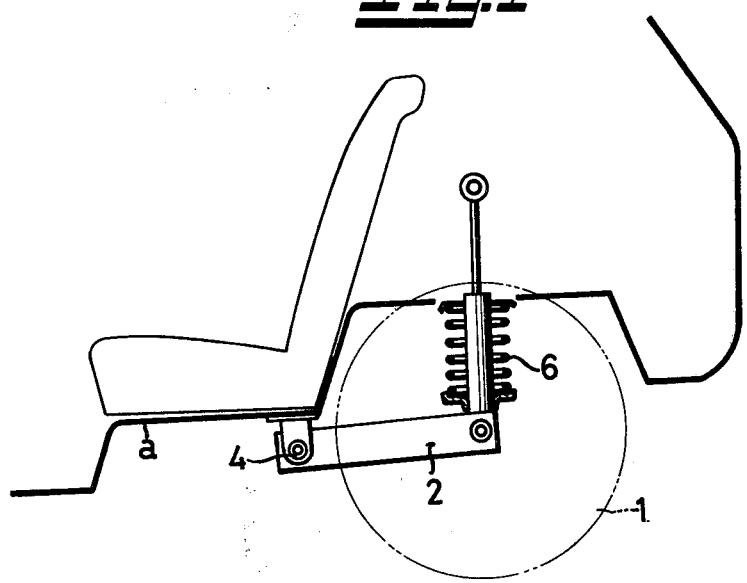
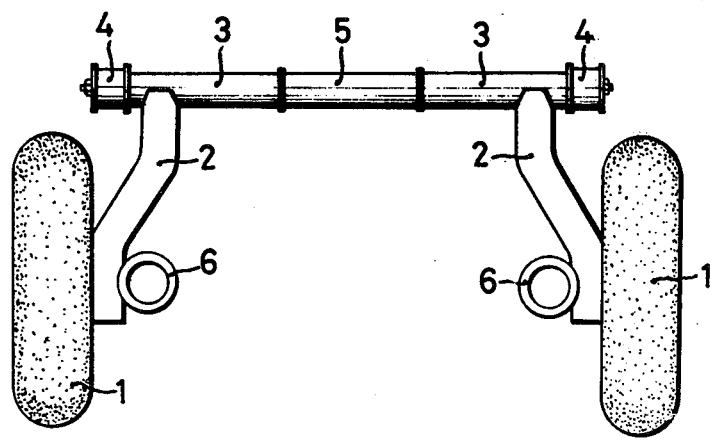

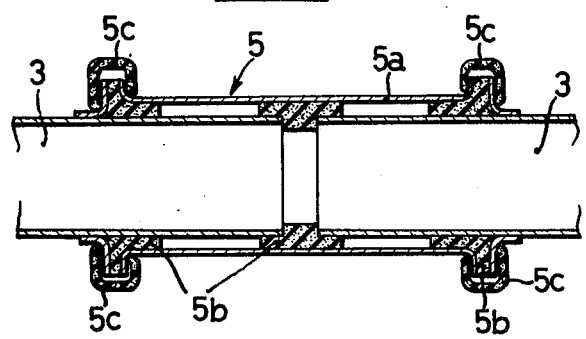
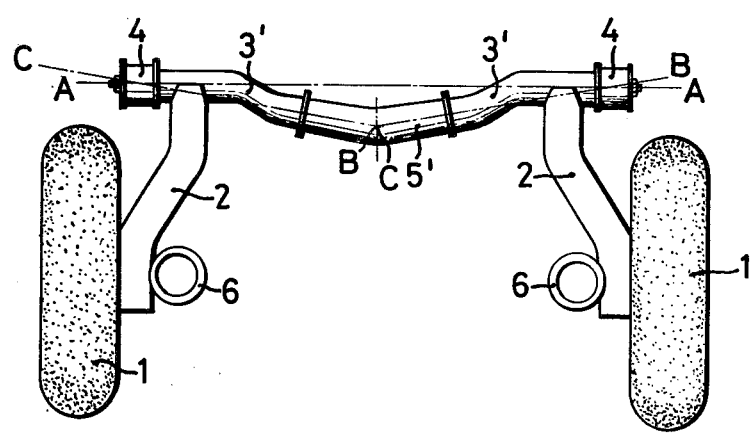
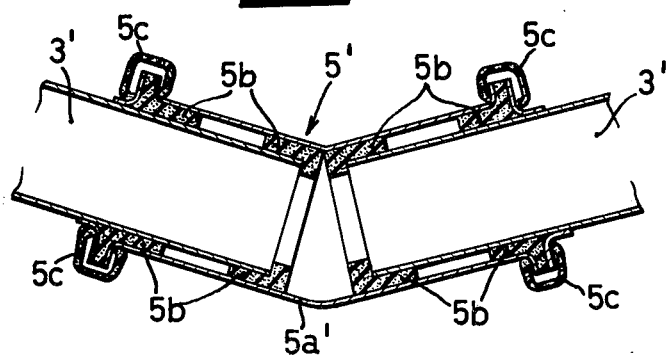

SUSPENSION APPARATUS FOR A VEHICLE

This application is a division of Ser. No. 692,575 filed June 3, 1976.

FIELD OF THE INVENTION

This invention relates to a suspension apparatus in a vehicle such as a motorcar or the like.

BACKGROUND OF THE INVENTION

In this kind of apparatus there had been hitherto known a so-called trailing type apparatus in which a pair of left and right trailing arms connected to a pair of left and right wheels are provided on the lower surface of a vehicle body frame at a pair of laterally extending left and right rotary shafts at their base ends so as to be individually swingable, and it has been usual in this case for each of the rotary shafts to be supported by bearings at both its inner and outer end portions. Accordingly, there are unavoidable disadvantages in that there are four bearing points in total, that is, two points for each of the left and right sides and thus the apparatus beocmes complicated in construction and large in weight.

SUMMARY OF THE INVENTION

An object of this invention is to provide an apparatus free from such disadvantages.

According to the invention there is provided suspension apparatus for a vehicle having left and right wheels, said suspension apparatus comprising a pair of left and right trailing arms connected to a respective wheel, a pair of laterally extending left and right rotary shafts connected to respective arms, said shafts having inner and outer ends, bearing means supporting each of said rotary shafts, at the outer end thereof, on said vehicle to permit individual rotation of said shafts and corresponding rocking of said arms and a tubular coupling interconnecting said rotary shafts at the inner ends thereof and permitting individual rotation of said shafts.

In further accordance with the invention, the coupling comprises an outer sleeve receiving said inner ends of the rotary shafts and rotatably supporting the same.

The suspension apparatus can be of trailing type in which case the sleeve is tubular and straight and has an axis coincident with the axes of rotation of the shafts.

The suspension can also be of semi-trailing type in which case the rotary shafts have bends therein such that said inner ends of said shafts rotate in said sleeve about axes which are inclined with respect to the axes of rotation of the shafts in said bearing means.

BRIEF DESCRIPTION OF THE DRAWING

FIG. 1 is a side elevational view of the embodiment according to the invention.

FIG. 2 is a top plan view of a major portion thereof.

FIG. 3 is an enlarged sectional plan view of a portion thereof.

FIG. 4 is a top plan view similar to FIG. 2 according to a modified version of this invention.

FIG. 5 is an enlarged sectional view of a portion thereof.

DETAILED DESCRIPTION

In the drawing, there is seen a suspension apparatus in a vehicle of trailing type including a pair of left and right trailing arms 2 connected to a pair of left and right wheels 1, the arms being mounted at the lower surface of a vehicle body frame a. A pair of laterally extending left and right rotary shafts 3 support the arms 2 at their base ends so as to be swingable individually. According to the invention, the pair of rotary shafts are supported at both outer end portions thereof on the vehicle body frame a through bearing portions 4 and are interconnected at their inner end portions thereof through a tubular coupling 5 so as to be rotatable individually.

Numeral 6 denotes springs mounted on respective rear end portions of the trailing arms 2. As shown clearly in FIG. 3, the coupling 5 comprises an outer sleeve 5a and bushings 5b disposed at suitable positions on the inner peripheral surface thereof, and dust-sealing members 5c are mounted on both outside end portions of the sleeve 5a.

Thus, according to the invention, the pair of left and right rotary shafts 3 are rotatably supported on the vehicle body frame a only at two points i.e., bearing portions 4 at their outer end portions, so that the apparatus can be simpler in construction and lower in weight than the conventional arrangement of four-point supporting type. Additionally there is the advantage that vibrations, noise and the like are decreased by positioning the two points 4 at comparatively high rigid portions of the vehicle body frame a. Additionally, when, during operation thereof, the two wheels 1 are simultaneously subjected to forces in the left and right directions, the bending moments applied to the two rotary shaft 3 are in opposite directions to one another in the coupling 5 and are cancelled whereby the operation is kept stable.

This invention can be applied also to a suspension apparatus of the so-called semi-trailing type in substantially the same manner as above.

Namely, in this kind of apparatus there has also been known a so-called semi-trailing type in which a pair of left and right trailing arms connected to a pair of left and right wheels are mounted on a lower surface of a vehicle body frame at a pair of laterally obliquely extending left and right rotary shafts at their base ends so as to be individually swingable, and it has been usual in this case for each of the rotary shafts to be supported by bearings at both its inner and outer end portions. Accordingly, there is the disadvantage that there are four supporting points in total, that is, two supporting points for each of the left and right ends and thus the apparatus becomes complicated in construction and large in weight. Additionally, differing from the trailing system, the semi-trailing type includes the disadvantage that the camber value is varied when the vehicle load is varied.

The invention has for an additional object to provide an apparatus free from the foregoing disadvantages.

This apparatus is illustrated in FIGS. 4 and 5 where the same reference numberals are used as in FIGS. 1–3 to designate the same structure and primes are employed for similar structure.

According to this modified embodiment of the invention, the left and right rotary shafts 3' are bent but still supported only at the two bearing portions 4 at the respective outer end portions thereof. Furtermore, when the two wheels 1 are simultaneously moved upwards and downwards, the two shafts 3' are turned about an axis A—A shown in FIG. 4 which is similar to the case of the trailing type and accordingly it is advatageous in that there is no change in camber value caused by change in load. Furthermore, on steering of the vehicle, the two shafts 3' can turn about an axis B—B and an axis C—C, respectively, and thus there can be afforded the advantage that the system can operate as a semi-trailing system.

What is claimed is:

1. Suspension apparatus for a vehicle having left and right wheels, said suspension apparatus comprising a pair of left and right trailing arms connected to a respective wheel, a pair of laterally extending left and and right rotary shafts connected to respective arms, said shafts having inner and outer ends, bearing means supporting each of said rotary shafts, at the outer ends thereof, on said vehicle to permit individual rotation of said shafts and corresponding rocking of said arms, and a tubular coupling interconnecting said rotary shafts at the inner ends thereof and permitting individual rotation of said shafts, said outer ends of said shafts having axes of rotation at right angles with respect to the longitudinal direction of the vehicle, said shafts being inclined with respect to the longitudinal direction of the vehicle, said tubular coupling having a V-shaped bent portion engaged solely by said inner ends of the shafts and being otherwise unsupported from the vehicle.

2. Suspension apparatus as claimed in claim 1 wherein said coupling comprises an outer sleeve receiving said inner ends of the rotary shafts and rotatably supporting the same.

3. Suspension apparatus as claimed in claim 2 comprising bushings in said sleeve rotatably supporting said rotary shafts therein.

4. Suspension apparatus as claimed in claim 3 comprising sealing members on said sleeve at the outer ends thereof.

5. Suspension apparatus as claimed in claim 1 comprising springs acting on said arms at a spaced location from said shafts.

6. Suspension apparatus as claimed in claim 1 wherein said rotary shafts have bends therein.

* * * * *